(12) United States Patent
Butler

(10) Patent No.: US 7,723,612 B2
(45) Date of Patent: May 25, 2010

(54) METHOD AND APPARATUS FOR REDUCING WIRE THEFT FROM STREET LIGHT AND UTILITY POLES

(76) Inventor: Timothy Earnest Butler, 22135 44A Avenue, Langley, BC (CA) V2Z 1B6

( * ) Notice: Subject to any disclaimer, the term of this patent is extended or adjusted under 35 U.S.C. 154(b) by 313 days.

(21) Appl. No.: 11/752,160

(22) Filed: May 22, 2007

(65) Prior Publication Data
US 2008/0289870 A1  Nov. 27, 2008

(51) Int. Cl.
H02G 7/20 (2006.01)

(52) U.S. Cl. .................. 174/45 R; 174/46; 174/40 R; 174/45 TD; 174/493; 174/43; 362/431; 411/402; 439/797

(58) Field of Classification Search ........... 174/45 R, 174/46, 40 R, 45 TD, 40 CC, 43, 493, 38; 220/251, 284; 362/431; 411/402; 52/736.1, 52/87, 198, 101; 439/797, 798
See application file for complete search history.

(56) References Cited

U.S. PATENT DOCUMENTS

| | | | |
|---|---|---|---|
| 342,552 A | 5/1886 | Westinghouse, Jr. | |
| 3,988,870 A | 3/1966 | Snavely | |
| 3,343,322 A * | 9/1967 | Lurkis et al. | 52/298 |
| 3,864,510 A | 2/1975 | Ramsey, Jr. et al. | |
| 3,872,234 A * | 3/1975 | Smith | 174/38 |
| 3,906,295 A | 9/1975 | Tessmer | |
| 3,242,252 A | 11/1976 | Bergenstein | |
| 3,991,264 A | 11/1976 | Connell | |
| 4,187,418 A * | 2/1980 | Harris | 200/295 |
| 4,243,834 A | 1/1981 | Logioco | |
| 4,488,013 A | 12/1984 | Ziegler | |
| 4,540,846 A | 9/1985 | Smith | |
| 4,570,884 A * | 2/1986 | Armbruster | 248/68.1 |
| 4,631,353 A | 12/1986 | Marks | |
| 5,092,663 A * | 3/1992 | Hivner | 385/100 |
| 5,216,203 A | 6/1993 | Gower | |
| 5,255,810 A | 10/1993 | Hosford | |
| 5,335,160 A | 8/1994 | Savoca | |

(Continued)

FOREIGN PATENT DOCUMENTS

EP    1 137 897    10/2001

(Continued)

Primary Examiner—Dhiru R Patel
(74) Attorney, Agent, or Firm—Oyen Wiggs Green & Mutala LLP

(57) ABSTRACT

An apparatus and method is provided for inhibiting theft of electrical wiring through the access opening of an electrical fixture supporting pole, such as a street light pole. Prior to securing the pole to the base, a wire clamping element is placed on the base around the passage for the power supply cable. The electrical power supply cable is clamped to a vertical surface of the clamping element, and the free end of the cable is extended to a location proximate the second opposed vertical surface of the clamping element. The electrical connection cable from the electrical fixture is then attached to the power supply cable, and the pole and the clamping element are secured to the base such that the access opening is positioned to provide access to the connections of the power supply cable and electrical connection cable from the electrical fixture, but access to the clamping device which secures the power supply cable to the first surface is not possible without removing the pole.

24 Claims, 11 Drawing Sheets

U.S. PATENT DOCUMENTS

| | | |
|---|---|---|
| 5,483,019 A | 1/1996 | Tourigny |
| 5,641,939 A | 6/1997 | Tourigny |
| 6,327,833 B1 | 12/2001 | Miskelley et al. |
| 6,525,273 B1 | 2/2003 | Cunningham |
| 6,669,515 B1 * | 12/2003 | Urban et al. ............... 439/797 |
| 6,683,247 B1 | 1/2004 | McTavish et al. |
| 6,872,883 B2 | 3/2005 | Ginsburg |
| 7,157,642 B2 | 1/2007 | Bowman et al. |
| 7,234,669 B2 * | 6/2007 | Franks, Jr. ................. 248/63 |
| 7,367,534 B2 * | 5/2008 | Franks, Jr. ................. 248/74.1 |
| 7,560,642 B2 * | 7/2009 | Ygnelzi et al. ............ 174/45 R |
| 2006/0254794 A1 | 11/2006 | Burke et al. |

FOREIGN PATENT DOCUMENTS

| | | |
|---|---|---|
| EP | 1 150 408 | 10/2001 |
| EP | 0 877 459 | 3/2004 |
| GB | 2 275 137 | 8/1994 |
| WO | WO2006/112783 | 10/2006 |

* cited by examiner

METHOD AND APPARATUS FOR REDUCING WIRE THEFT FROM STREET LIGHT AND UTILITY POLES

TECHNICAL FIELD

The invention relates to street light and traffic light pole design and more particularly street and traffic light pole designs which inhibit theft of wiring.

BACKGROUND

Municipal street lights, traffic lights, highway lights and lighting for parking lots, playing fields and the like are generally mounted on hollow metal poles which are secured to a concrete base by anchor bolts. The lighting fixture is mounted at the top of the pole. The electrical wiring for providing electrical power to the lighting fixture is connected to underground cables which extend upwardly through the pole base. Near the bottom of the pole, an access hole or hand-hole, covered with a removable cover plate, is provided so that a service person can access the wiring for servicing, such as changing a fuse.

Due to increases in commodity prices, particularly the price of copper, theft of copper wiring from street lights has become a serious problem. Thieves access the wiring through the hand-hole, connect the wiring to a truck or car and pull up long sections of wiring which is sold as scrap metal. Damage done to the lighting system by such activities is considerable. Merely locking the hand-hole cover does not solve the problem. There is therefore a need for a system which inhibits wire theft from street and traffic light poles.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The invention therefore provides an apparatus for securing electrical wiring against theft through the access opening of an electrical fixture supporting pole, the electrical fixture supporting pole comprising an elongated hollow pole having an upper end and a lower end adapted for removably securing to a base, and an access opening located proximate the lower end, wherein the base is provided with a passage for receiving an electrical power supply cable, the apparatus comprising an upright element for securing to the base and extending in a direction perpendicular to the base once secured thereto, and means for releasably securing an electrical cable to the upright element, wherein said upright element is configured to prevent access to the means for releasably securing an electrical cable from the access opening when the lower end of the pole is secured to said base.

According to another aspect of the invention, there is provided an apparatus for securing electrical wiring against theft through the access opening of an electrical fixture supporting pole, the electrical fixture supporting pole comprising an elongated hollow pole having an upper end and a lower end adapted for removably securing the pole to a base, and an access opening located proximate the lower end, wherein the base is provided with a passage for receiving an electrical power supply cable, the apparatus comprising an upright element for securing to the base and extending in a direction perpendicular to the base once secured thereto, and means for releasably securing an electrical cable to a first side of the upright element, whereby the upright element separates the hollow interior of the lower end of the elongated hollow pole into two sections, a first section accessible from the access opening and a second section containing the means for releasably securing an electrical cable which is not accessible by an individual through the access opening.

According to another aspect of the invention, there is provided a method of inhibiting theft of electrical wiring through the access opening of an electrical fixture supporting pole for supporting an electrical fixture having an electrical connection cable, the electrical fixture supporting pole comprising an elongated hollow pole adapted at its lower end for removably securing to a base provided with a passage for receiving an electrical power supply cable, and an access opening proximate the lower end of the pole, said method comprising: i) prior to securing the elongated pole to the base, placing an upright element proximate to the passage extending in an upward direction, the upright element provided with first and second opposed surfaces, and means for releasably securing an electrical cable to a first one of the opposed surfaces; ii) securing the electrical power supply cable to the first one of said opposed vertical surfaces; iii) extending the upper end of the power supply cable to a location proximate the second opposed surface of the upright element; iv) attaching the electrical connection cable from the electrical fixture to the power supply cable; and v) securing the pole and the upright element to the base such that the access opening is positioned to provide access to the second opposed surface of the upright element; wherein the upright element is configured to prevent access to the means for releasably securing an electrical cable from the access opening when the pole and the upright element are secured to the base such that the access opening is positioned to provide access to the second opposed surface of the upright element.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

While the preferred embodiment of the invention is described with respect to street light poles, the invention has application to all poles which support electrical fixtures, including traffic light poles, poles supporting illuminated signs and the like. The term "electrical fixture supporting pole" is used herein to describe all such poles.

Figure 1:
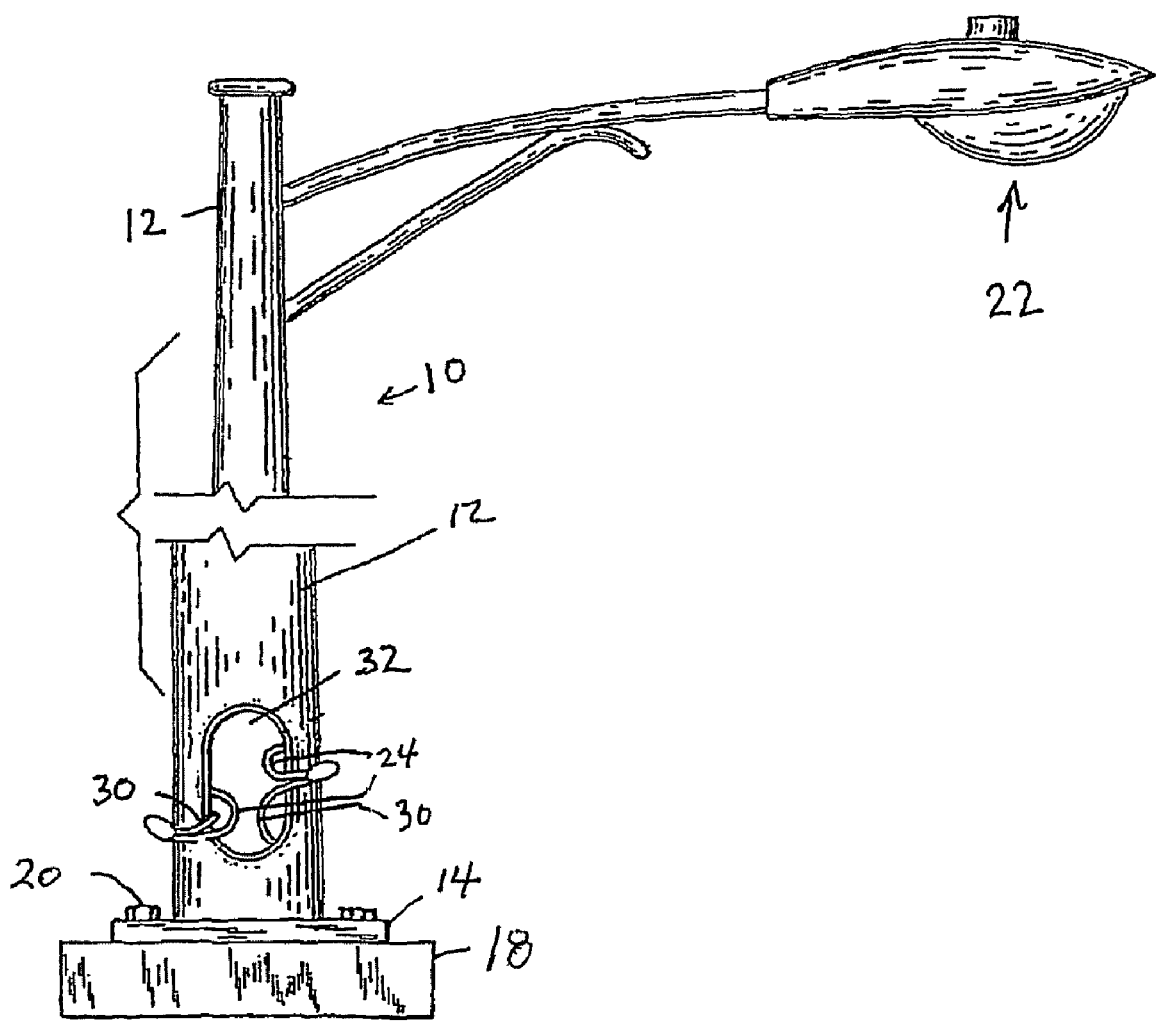
FIG. 1 is a side elevation of a prior art street light pole, the broken lines indicating that the central section of the pole is not shown.

With reference to FIG. 1, an existing street light 10 comprises a long, hollow pole 12, generally of metal such as steel or aluminum and tapered. Pole 12 is welded to a lower flange 14. Flange 14 is mounted on a concrete base 18 by threaded bolts 20. Lighting fixture 22 is mounted at the top of the pole 12. The electrical wiring 24 for providing electrical power to the lighting fixture 22 is connected to underground power supply cables 30 which extend upwardly through a hollow passage in the street light pole base 18. Near the bottom of the street light pole 12 an access hole or hand-hole 32, covered with a removable cover plate (not shown), is provided so that a service person can access the wiring for servicing, such as changing a fuse.

Figure 2:
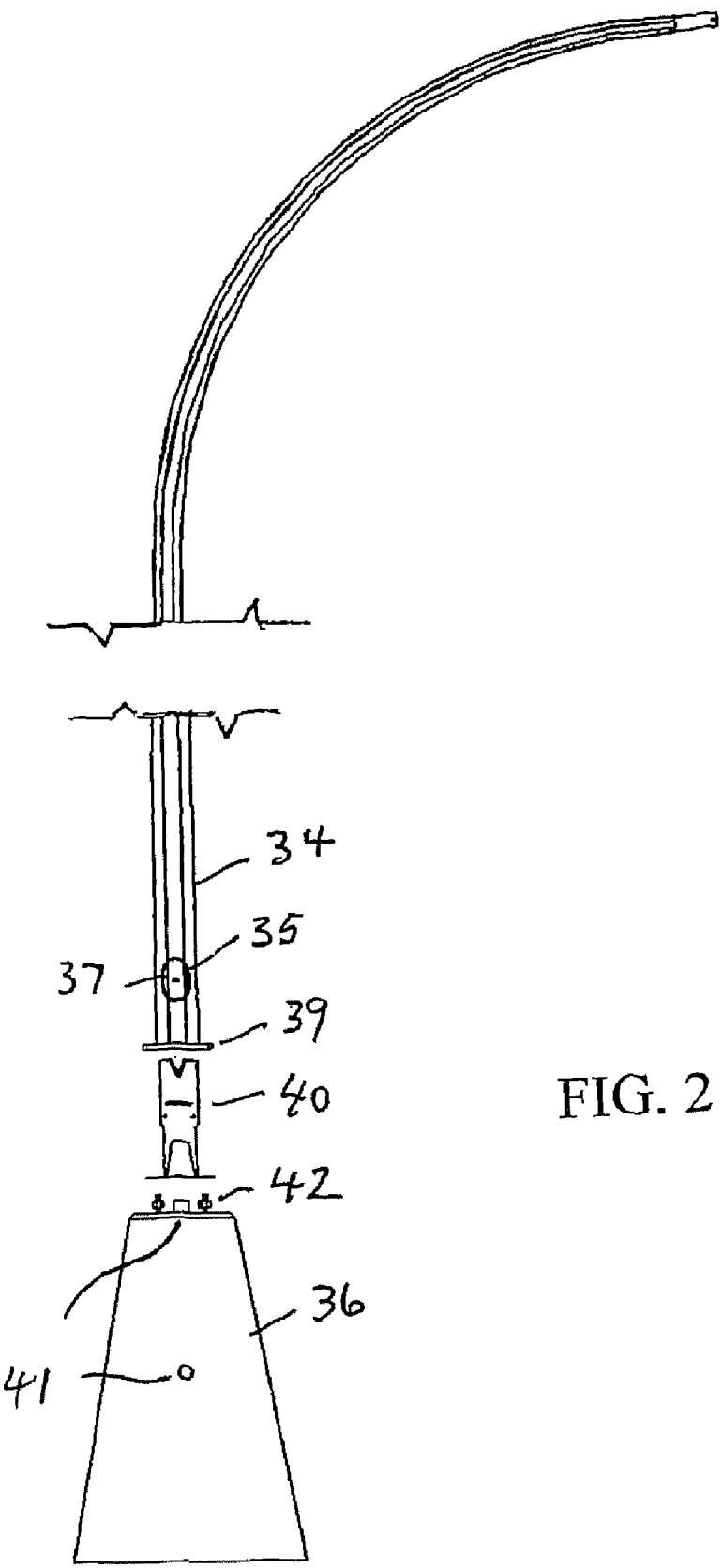
FIG. 2 is an exploded side elevation view of a street light pole incorporating the invention, broken lines indicating that the central section of the pole is removed from the view.
Figure 3:
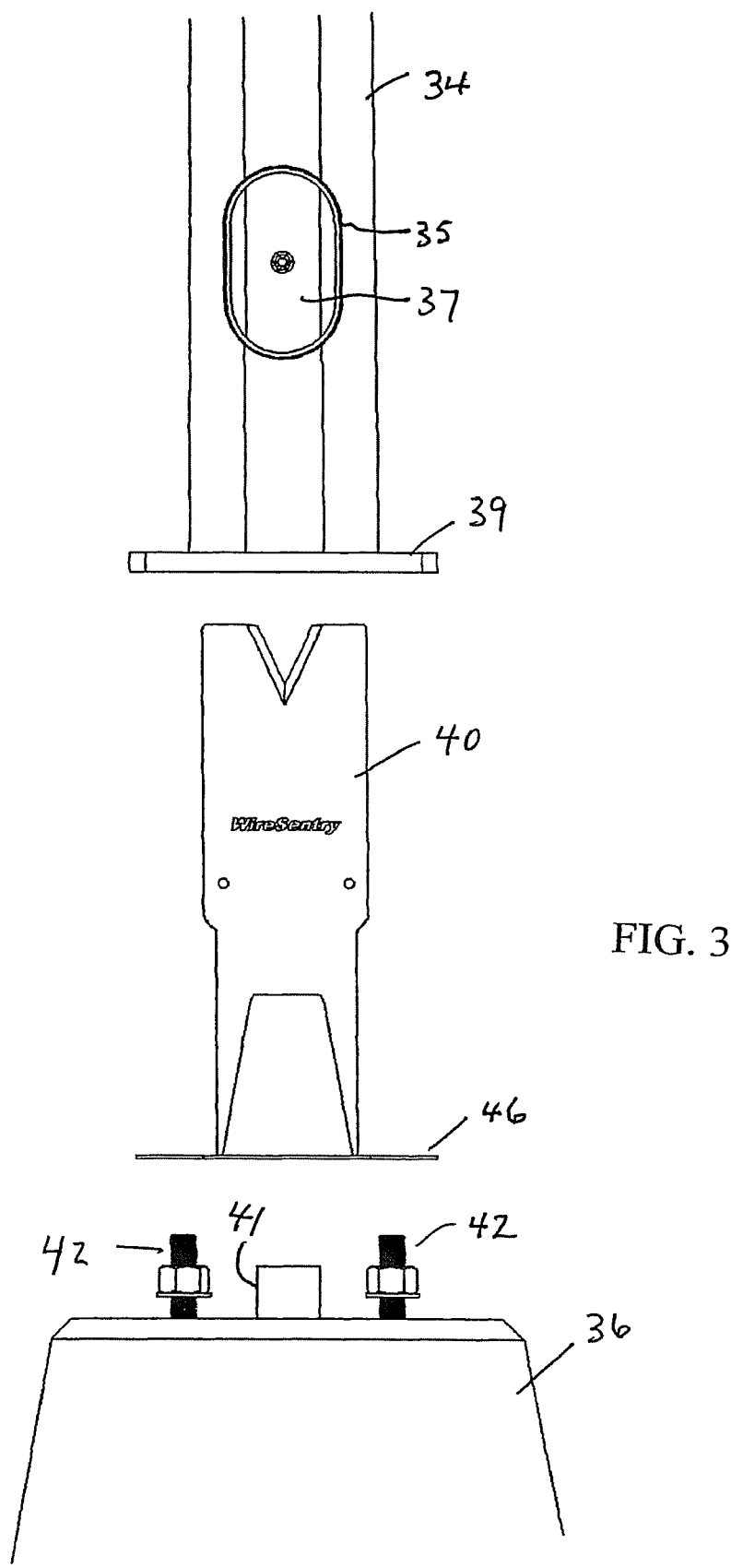
FIG. 3 is a detail of the exploded side elevation view in FIG. 2 of a street light pole incorporating the invention.
Figure 4:
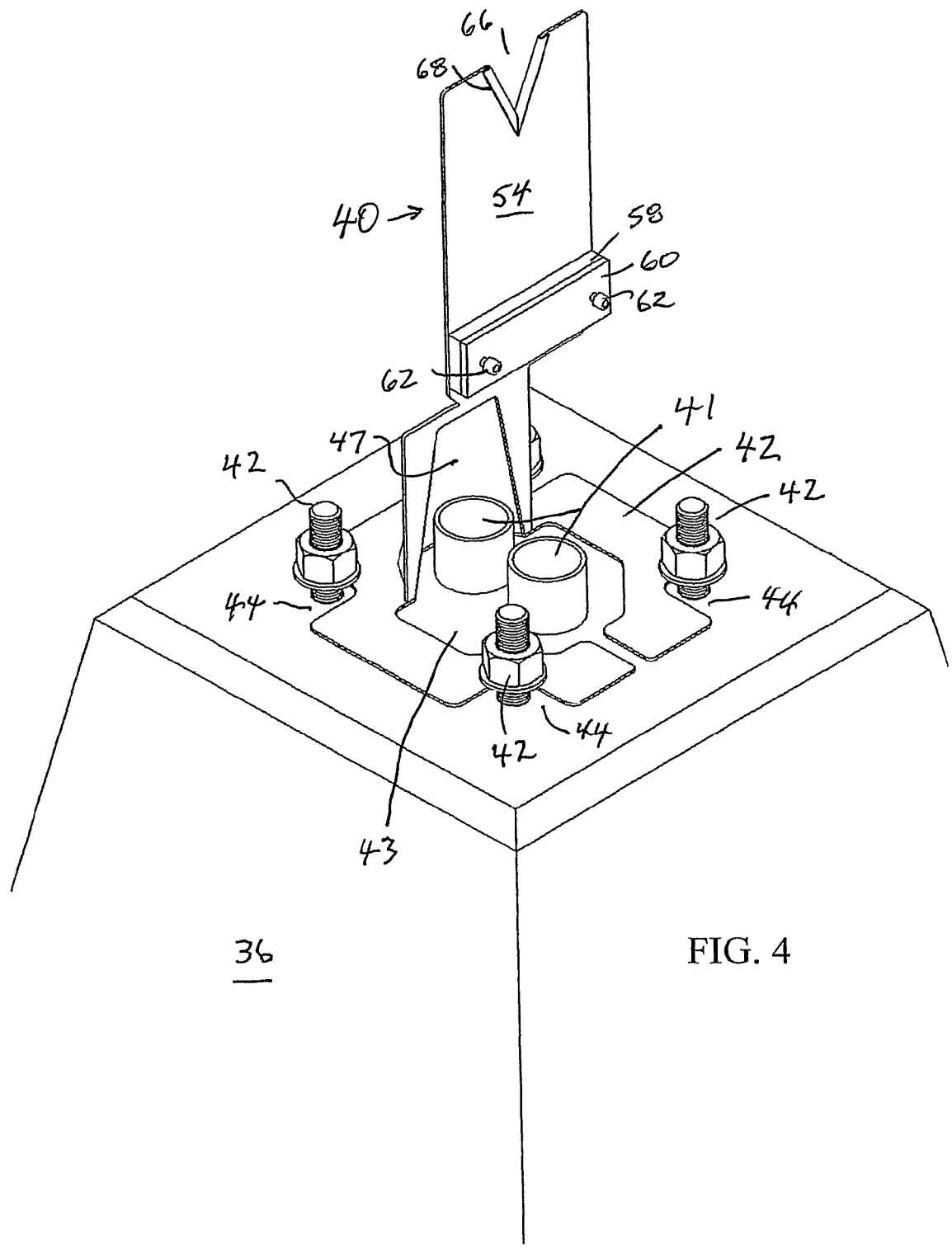
FIG. 4 is a perspective view of the upright wire clamping element used in the invention mounted on a street light pole base.
Figure 5:
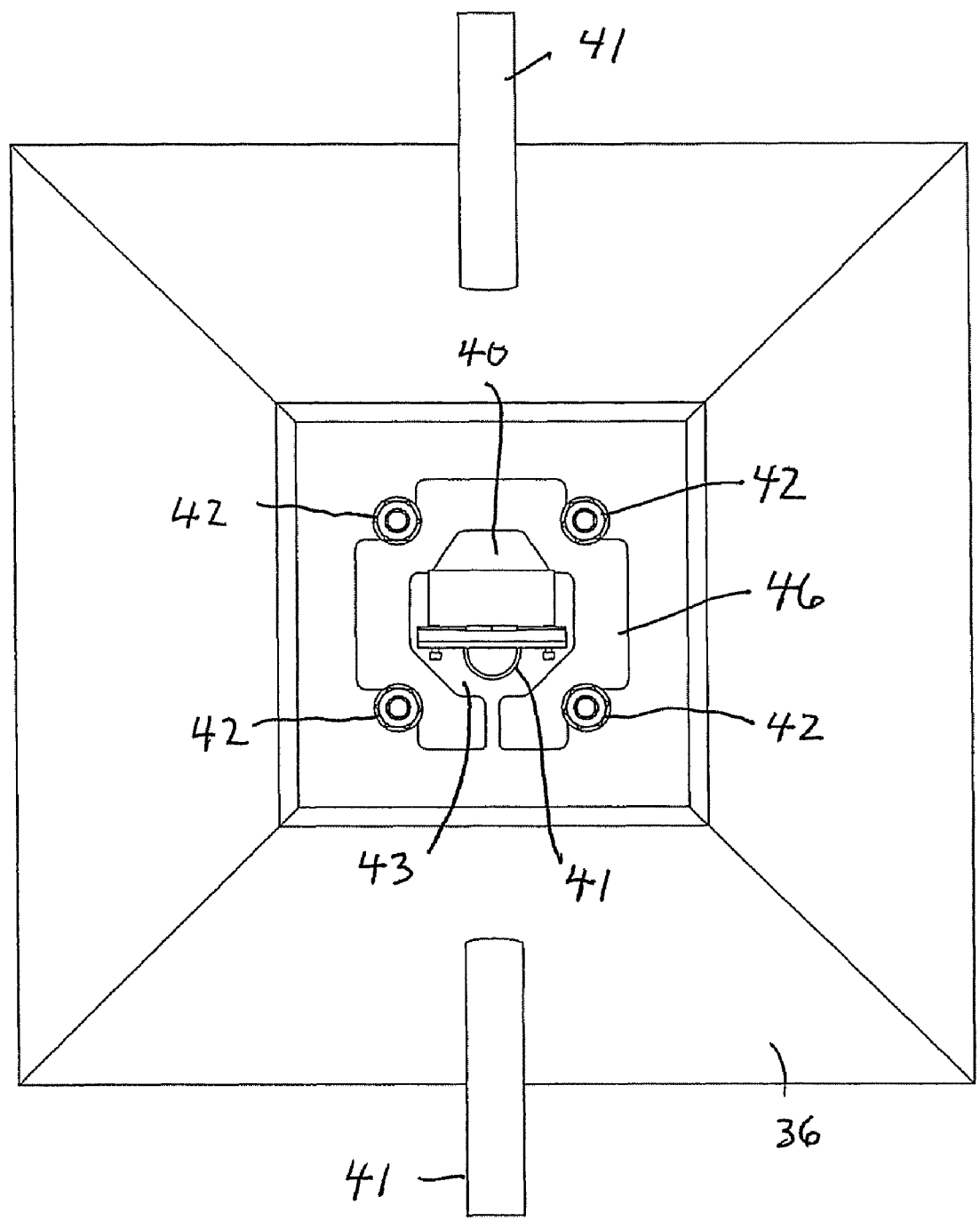
FIG. 5 is a top view of the upright wire clamping element shown in FIG. 4.
Figure 6:
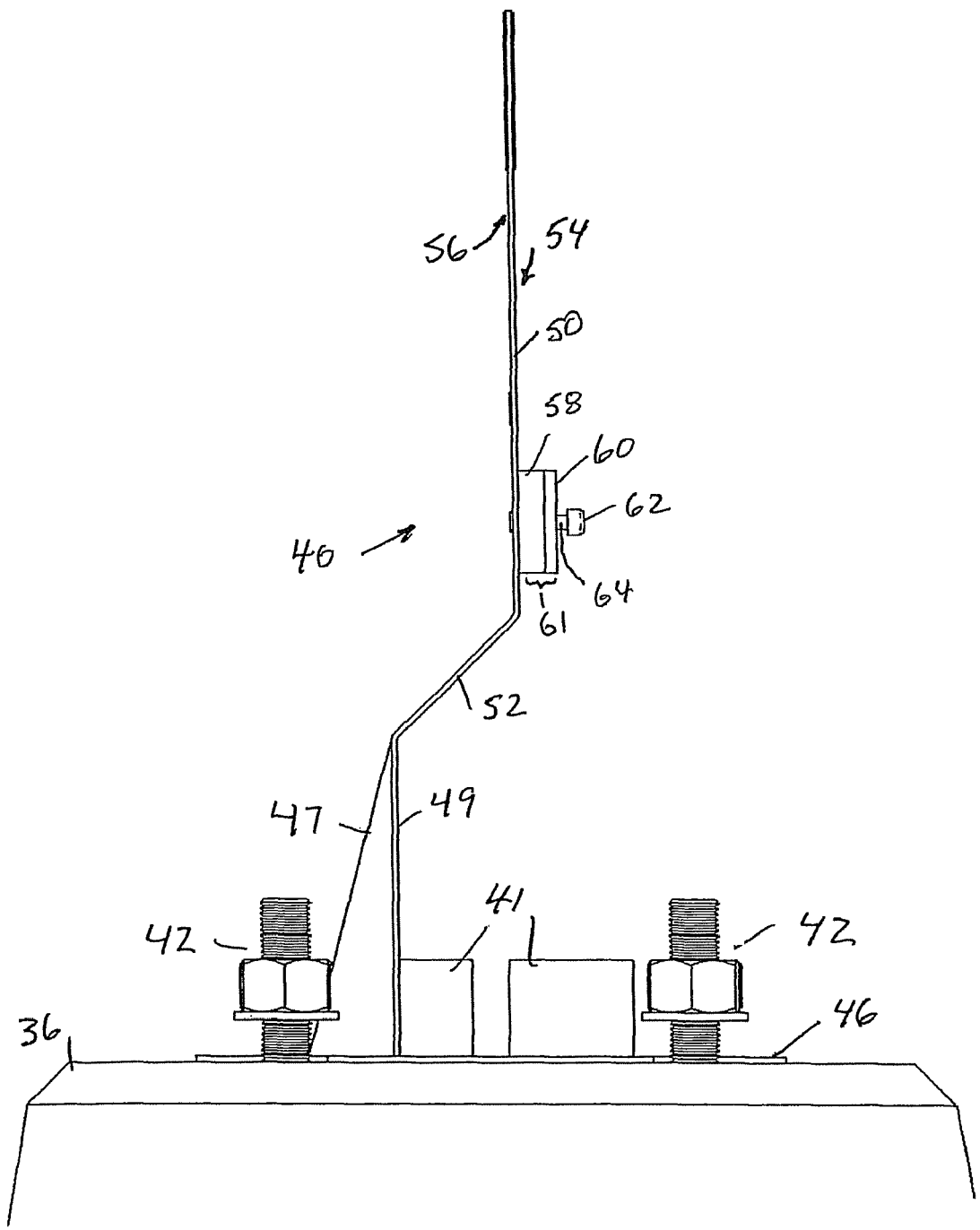
FIG. 6 is a side view of the upright wire clamping element shown in FIG. 4.
Figure 7:
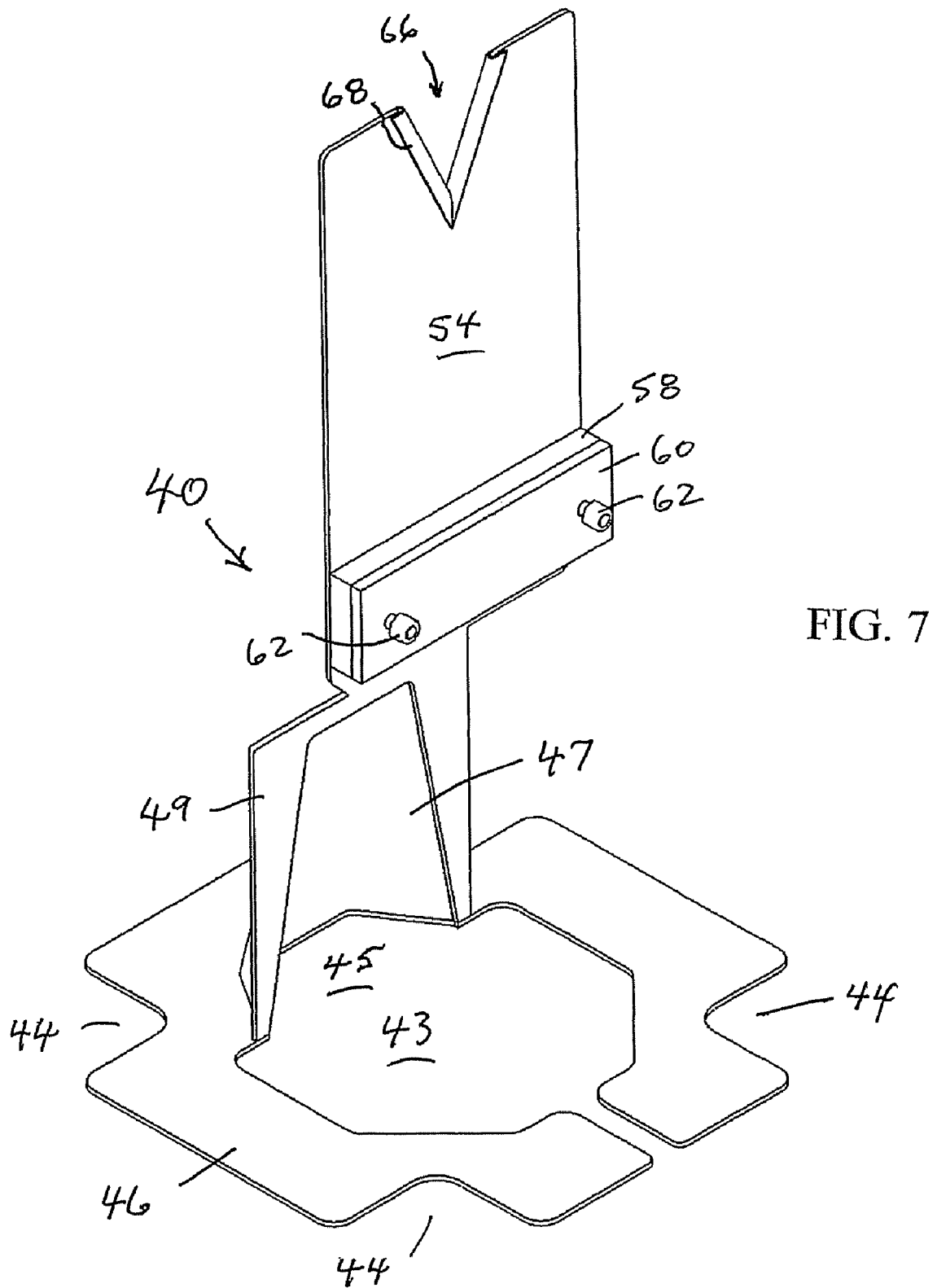
FIG. 7 is a perspective view of the upright wire clamping element used in the invention.
Figure 8:
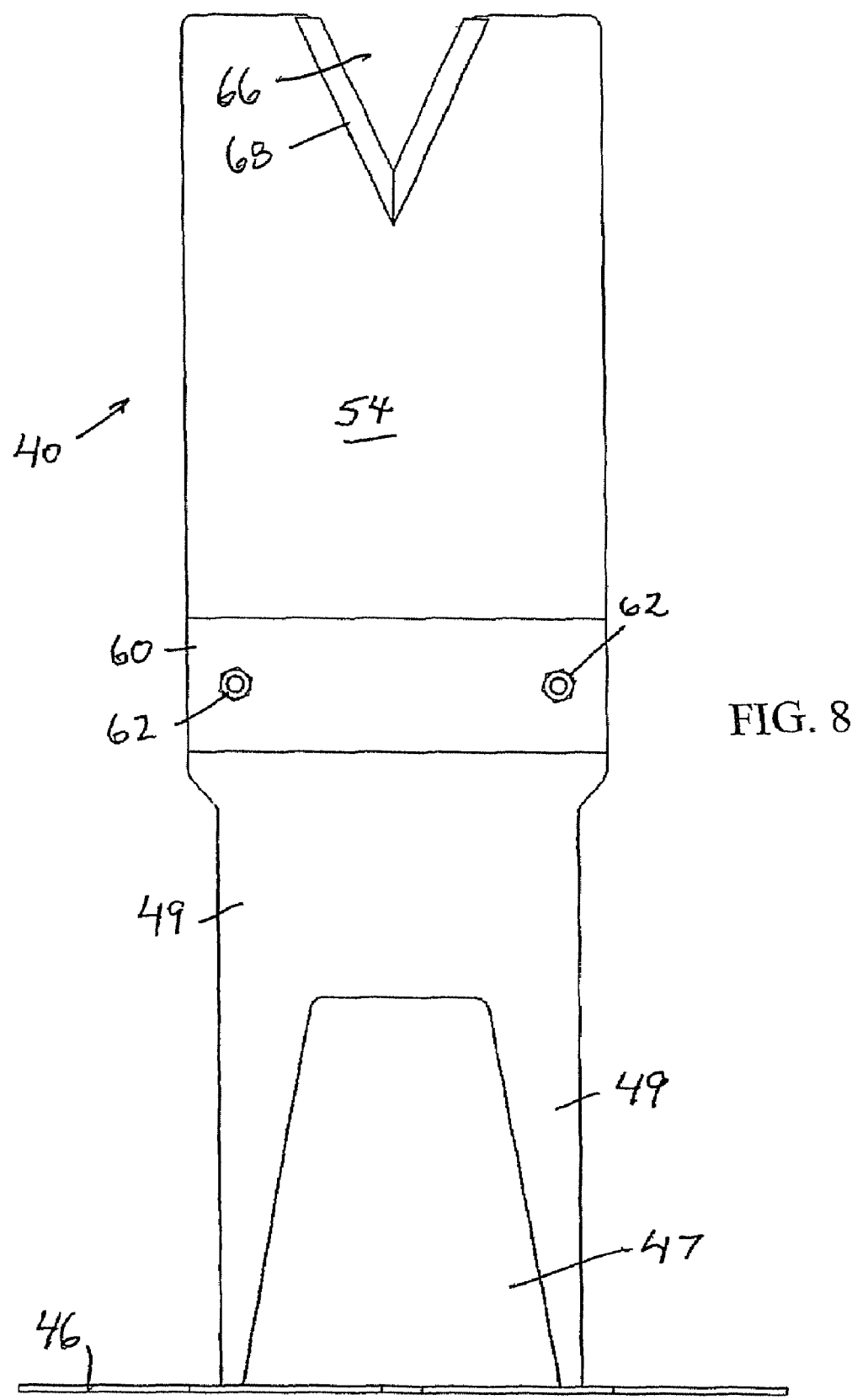
FIG. 8 is a front view of the upright wire clamping element shown in FIG. 7.
Figure 9:
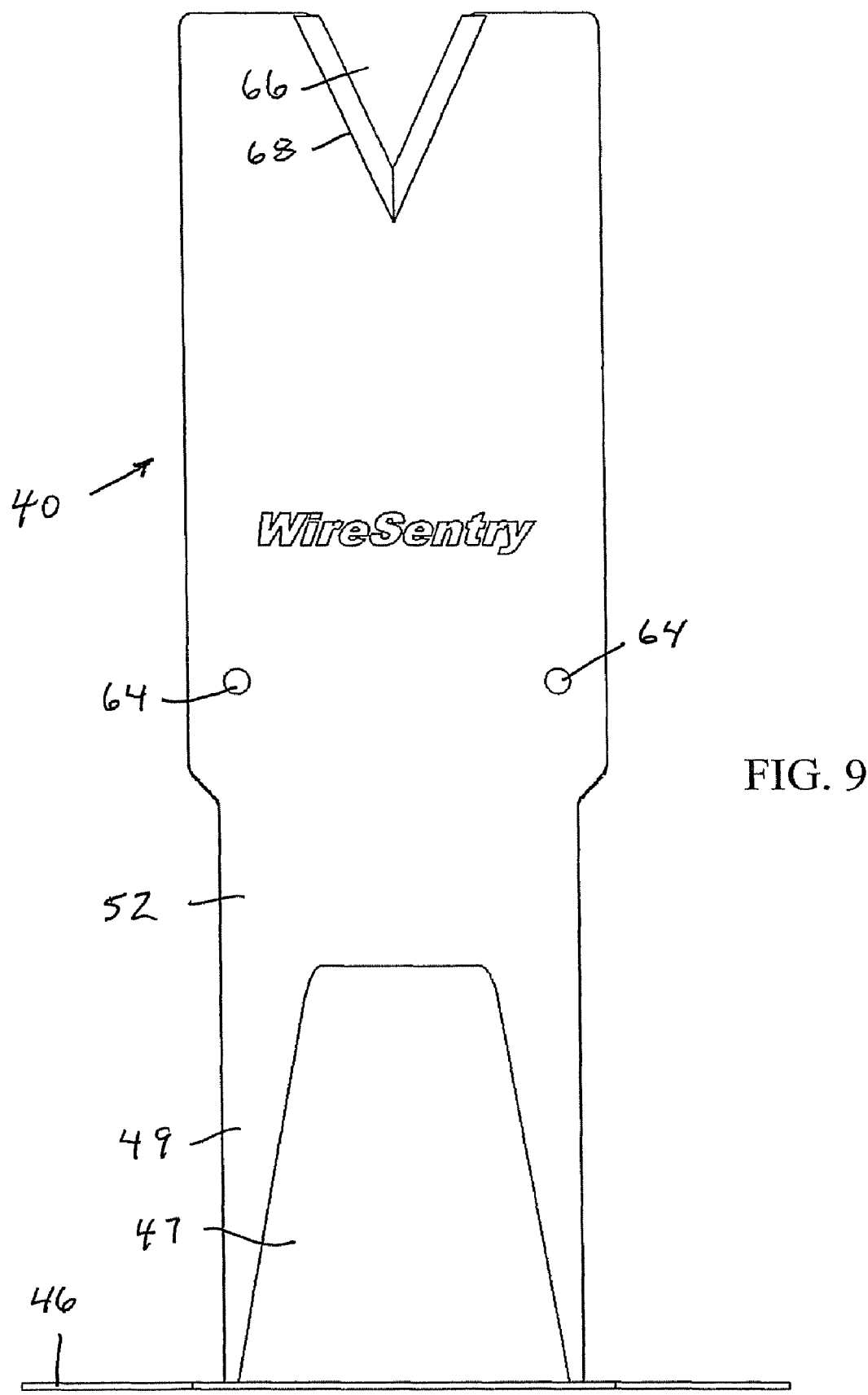
FIG. 9 is a rear view of the upright wire clamping element shown in FIG. 7.
Figure 10:
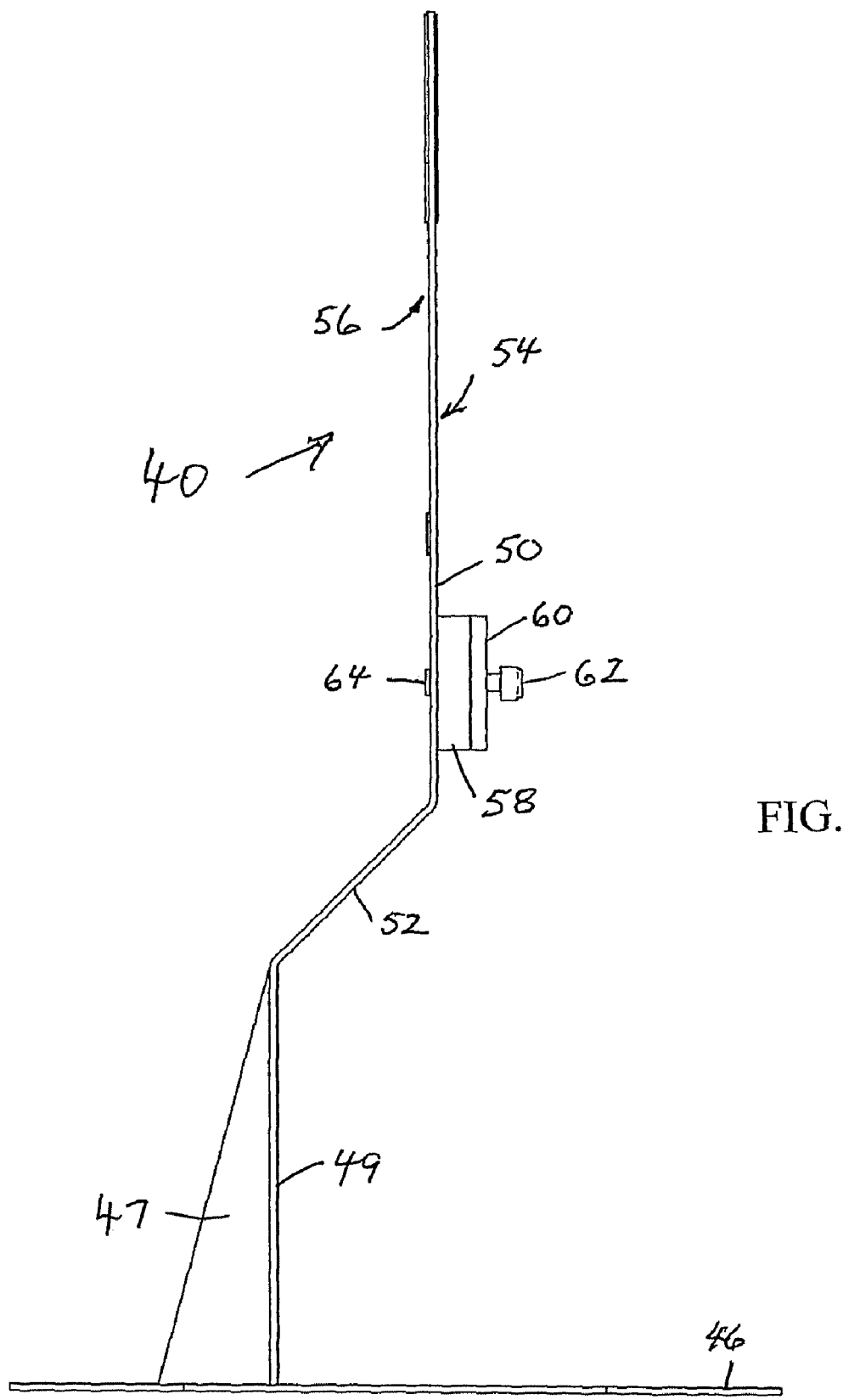
FIG. 10 is a side view of the upright wire clamping element shown in FIG. 7.
Figure 11:
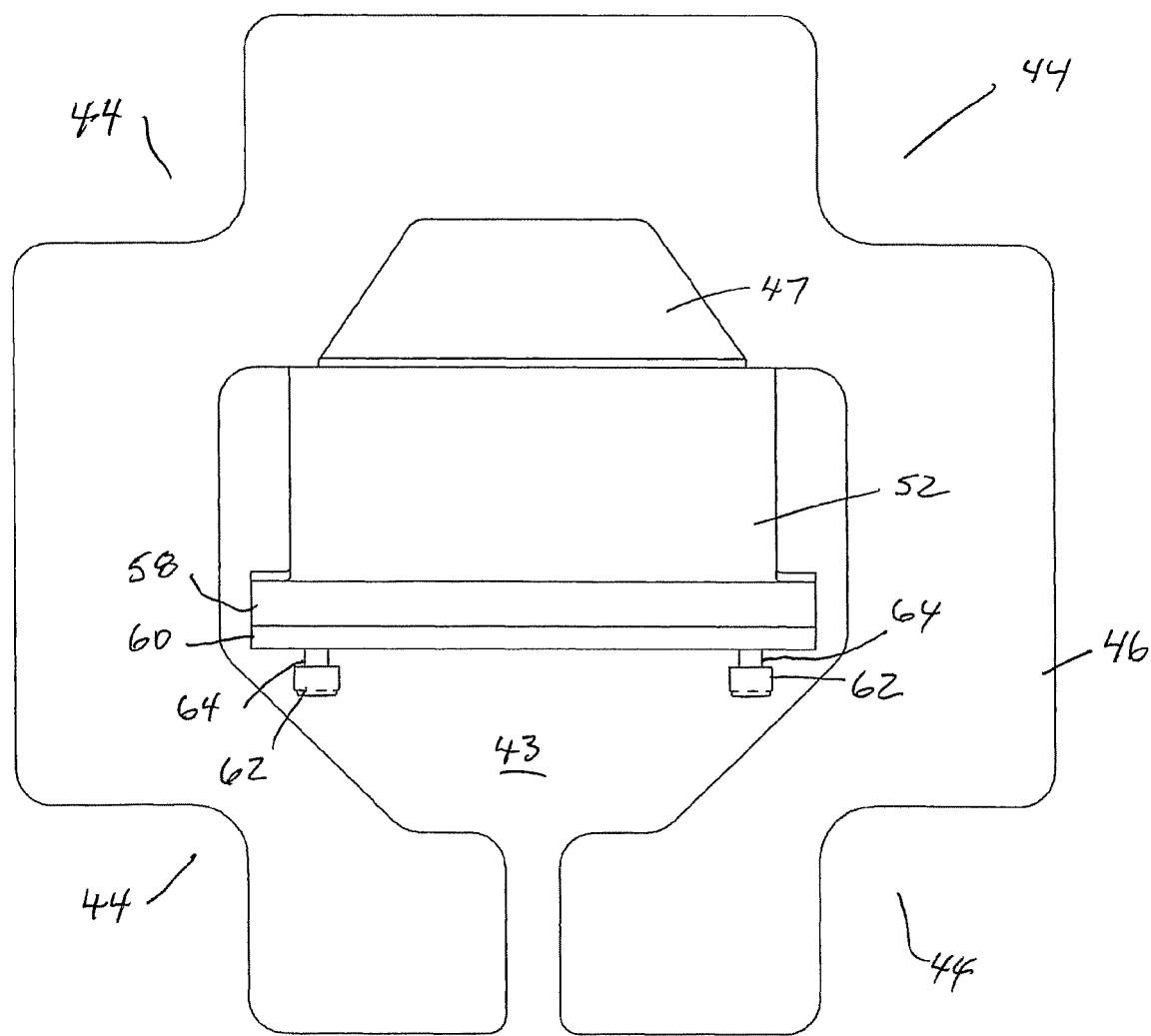
FIG. 11 is a bottom view of the upright wire clamping element shown in FIG. 7.

FIGS. 2 through 11 illustrate the present invention. With reference to FIGS. 2 and 3, a street light or traffic light pole 34 has a hand-hole 35, hand-hole cover 37 and flange 39 which is secured to concrete base 36 by anchor bolts 42. Electrical power for the lighting fixture is provided by incoming and outgoing power supply cables which extend through passageways 41 and connect with other street lights in the system. Before the street light or traffic pole 34 is installed on concrete base 36, an upright element 40 is placed onto the concrete base 36. Upright element 40 is formed of steel plate or similar durable metal. Upright element 40 is centered inside the anchor bolts 42 by aligning notches 44 in plate 46 with the anchor bolts 42 (FIG. 4). Incoming and outgoing power supply cables 30 from the underground street light wiring system are connected through base 36 via two hollow passageways 41 which extend into and out of base 36 and up through aperture 43 in plate 46. Vertical support 49 has a cut-out 45 and sloping surface 47 to accommodate the cable passageways 41. Vertical support 49 is connected to vertical plate 50 by sloping plate 52. Vertical plate 50 has opposed surfaces 54, 56. Rubber block 58 is removably secured to vertical plate 50 by threaded screw studs 64, which are mechanically pressed into vertical plate 50. Rubber block 58 has a metal backing plate 60 together forming a clamping body 61 (FIG. 6). Nuts 62 tighten backing plate 60 and attached rubber block 58 against surface 54, providing an even pressure onto rubber block 58 against surface 54.

To secure incoming and outgoing power supply cables 30, rubber block 58 is loosened or removed from screw studs 64 by unscrewing nuts 62. Cables 30 are gripped between rubber block 58 and vertical surface 54 by first passing the ends of the two cables between rubber block 58 and vertical surface 54. The free ends of the two power supply cables 30 are then draped over the V-shaped notch 66, which has a rubber edge 68 to protect the wires. Rubber block 58 is then tightened against cables 30 and surface 54 by tightening nuts 62, thereby gripping cables 30. Wire 24 from the fixture is then connected to the free ends of power supply cables 30 such that the fuse and wire connectors lie against face 56 in proximity to access hole 35. The street light pole 34 is then installed on the base 36 by placing flange 39 on top of plate 46 and base 36, and tightening flange 39 of pole 34 onto base 36 with anchor bolts 42, thereby securing plate 46 and wire clamping element 40 in place on base 36. Vertical element 50 is wide and high enough that it is not possible for an individual to access nuts 62 to loosen them from access hole 35. The width of vertical element 50 is slightly less than the interior diameter of pole 34, so a thief cannot access nuts 62 with a hand or tools to loosen rubber block 58, and extends high enough above access hole 35 similarly so a thief cannot access nuts 62 with a hand or tools to loosen rubber block 58.

While access to face 56 of upright element 40 is available through access hole 35 to permit servicing of the wire connectors and fuses, individuals cannot now pull the power supply cables 30 from the pole without entirely removing the pole, since cables 30 are gripped securely against face 54 of upright element 40. Rubber bock 58 can only be loosened by removing pole 34 to allow access to nuts 62.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. Apparatus for securing electrical wiring against theft through an access opening of an electrical fixture supporting pole, said electrical fixture supporting pole comprising an elongated hollow pole having an interior diameter, an upper end and a lower end adapted for removably securing to a base, and an access opening located proximate said lower end, wherein said base is provided with a passage for receiving an electrical power supply cable, said apparatus comprising an upright element for securing to said base and extending in a direction perpendicular to said base once secured thereto, and means for releasably securing said electrical cable to said upright element, wherein said upright element is configured to prevent access to said means for releasably securing said electrical cable from said access opening when said lower end of said pole is secured to said base.

2. The apparatus of claim 1 wherein said upright element extending in a direction perpendicular to said base comprises an element extending substantially across the interior diameter of said lower end of said elongated hollow pole when said lower end of said pole is secured to said base and having first and second opposed surfaces, and wherein said means for releasably securing said electrical cable to said upright element is secured to a first one of said opposed surfaces, said second one of said opposed surfaces being accessible though said access opening.

3. The apparatus of claim 2 wherein said element extending substantially across the interior diameter of said lower end of said elongated hollow pole is configured to permit passage of said electrical supply power cable from said means for releasably securing said electrical cable to said upright element to a location proximate said second one of said opposed surfaces.

4. The apparatus of claim 3 wherein said upright element extending in a direction perpendicular to said base comprises a passage for receiving said electrical power supply cable.

5. The apparatus of claim 2 wherein said means for releasably securing said electrical cable to said upright element comprises clamping means for releasably securing said electrical cable to said first one of said opposed surfaces.

6. The apparatus of claim 5 wherein said clamping means for releasably securing said electrical cable to said first one of said opposed surfaces comprises a clamping body for bearing against said first one of said opposed surfaces and fastening means for releasably securing said clamping body against said first one of said opposed surfaces.

7. The apparatus of claim 6 wherein said clamping body comprises a body of resilient material for bearing against said first one of said opposed surfaces.

8. The apparatus of claim 1 wherein said pole is adapted for removably securing to said base by being provided with a flange connected to the lower end of said pole for removably securing said pole to said base by fastening means, and wherein said upright element comprises a plate sized to be secured between said flange and said base when said flange is secured to said base by fastening means, thereby securing said upright element to said base.

9. The apparatus of claim 8 wherein said plate is provided with an aperture to permit passage of said electrical power supply cable.

10. Apparatus for securing electrical wiring against theft through an access opening of an electrical fixture supporting pole, said electrical fixture supporting pole comprising an elongated hollow pole having an interior diameter, an upper end and a lower end having a hollow interior and adapted for removably securing said pole to a base, and an access opening located proximate said lower end, wherein said base is provided with a passage for receiving an electrical power supply cable, said apparatus comprising an upright element for securing to said base and extending in a direction perpendicular to said base once secured thereto, and means for releasably securing said electrical cable to a first side of said upright element, whereby said upright element separates the hollow interior of said lower end of said elongated hollow pole into two sections, a first section accessible from said access opening and a second section containing said means for releasably securing said electrical cable which is not accessible by an individual through said access opening.

11. The apparatus of claim 10 wherein said upright element extending in a direction perpendicular to said base comprises an element extending substantially across the interior diameter of said lower end of said elongated hollow pole when said lower end of said pole is secured to said base and having first and second opposed surfaces, and wherein said means for releasably securing said electrical cable to said upright element is secured to a first one of said opposed surfaces, said second one of said opposed surfaces being accessible though said access opening.

12. The apparatus of claim 11 wherein said element extending substantially across the interior diameter of said lower end of said elongated hollow pole is configured to permit passage of said electrical supply power cable from said means for releasably securing said electrical cable to said upright element to a location proximate said second one of said opposed surfaces.

13. The apparatus of claim 12 wherein said upright element extending in a direction perpendicular to said base comprises a passage for receiving said electrical power supply cable.

14. The apparatus of claim 10 wherein said means for releasably securing said electrical cable to said upright element comprises clamping means for releasably securing said electrical cable to said first one of said opposed surfaces.

15. The apparatus of claim 14 wherein said clamping means for releasably securing said electrical cable to said first one of said opposed surfaces comprises a clamping body for bearing against said first one of said opposed surfaces and fastening means for releasably securing said clamping body against said first one of said opposed surfaces.

16. The apparatus of claim 15 wherein said clamping body comprises a body of resilient material for bearing against said first one of said opposed surfaces.

17. The apparatus of claim 10 wherein said pole is adapted for removably securing to a base by being provided with a flange connected to the lower end of said pole for removably securing said pole to said base by fastening means, and wherein said upright element comprises a plate sized to be secured between said flange and said base when said flange is secured to said base by fastening means, thereby securing said upright element to said base.

18. The apparatus of claim 17 wherein said plate is provided with an aperture to permit passage of said electrical power supply cable.

19. A method of inhibiting theft of electrical wiring through an access opening of an electrical fixture supporting pole for supporting an electrical fixture having an electrical connection cable for connecting to an electrical power supply cable, said electrical fixture supporting pole comprising an elongated hollow pole adapted at its lower end for removably securing to a base provided with a passage for receiving said electrical power supply cable, and an access opening proximate said lower end of said pole, said method comprising:
  i) prior to securing said elongated pole to said base, placing an upright element proximate to said passage extending in an upward direction, said upright element provided with first and second opposed surfaces, and means for releasably securing said electrical cable to a first one of said opposed surfaces;
  ii) securing said electrical power supply cable to said first one of said opposed vertical surfaces;
  iii) extending an upper end of said power supply cable to a location proximate said second opposed surface of said upright element;
  iv) attaching the electrical connection cable from said electrical fixture to said power supply cable; and
  v) securing said pole and said upright element to the base such that said access opening is positioned to provide access to said second opposed surface of said upright element;

wherein said upright element is configured to prevent access to said means for releasably securing said electrical cable from said access opening when said pole and said upright element are secured to the base such that said access opening is positioned to provide access to said second opposed surface of said upright element.

20. The method of claim 19 wherein the width and height of said upright element are selected to prevent access to said means for releasably securing said electrical cable from said access opening.

21. The method of claim 19 wherein said upright element comprises an element extending substantially across the interior diameter of said lower end of said elongated hollow pole when said lower end of said pole is secured to said base.

22. The method of claim 21 wherein said element extending substantially across the interior diameter of said lower end of said elongated hollow pole is configured to permit passage of said electrical supply power cable from said means for releasably securing said electrical cable to said upright element to a location proximate said second one of said opposed surfaces.

23. The method of claim 22 wherein said element extending substantially across the interior diameter of said lower end of said elongated hollow pole comprises a passage for receiving said electrical power supply cable and said electrical power supply cable is extended through said passage.

24. The method of claim 19 wherein said pole is adapted for removably securing to said base by being provided with a flange connected to the lower end of said pole for removably securing said pole to said base by fastening means, and wherein said upright element comprises a plate sized to be secured between said flange and said base when said flange is secured to said base by fastening means, thereby securing said upright element to said base.

* * * * *